R. COWDEN.
Hay and Grain Unloader.
No. 198,574. Patented Dec. 25, 1877.
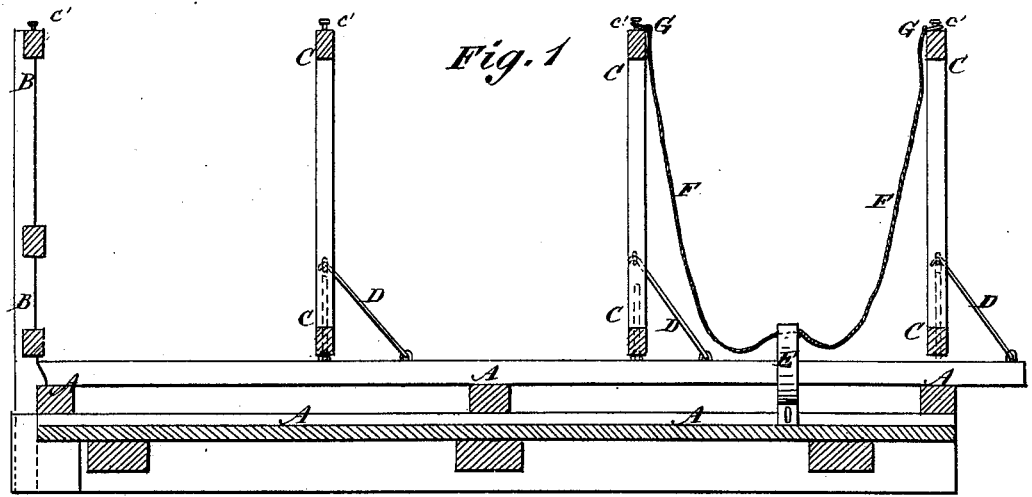
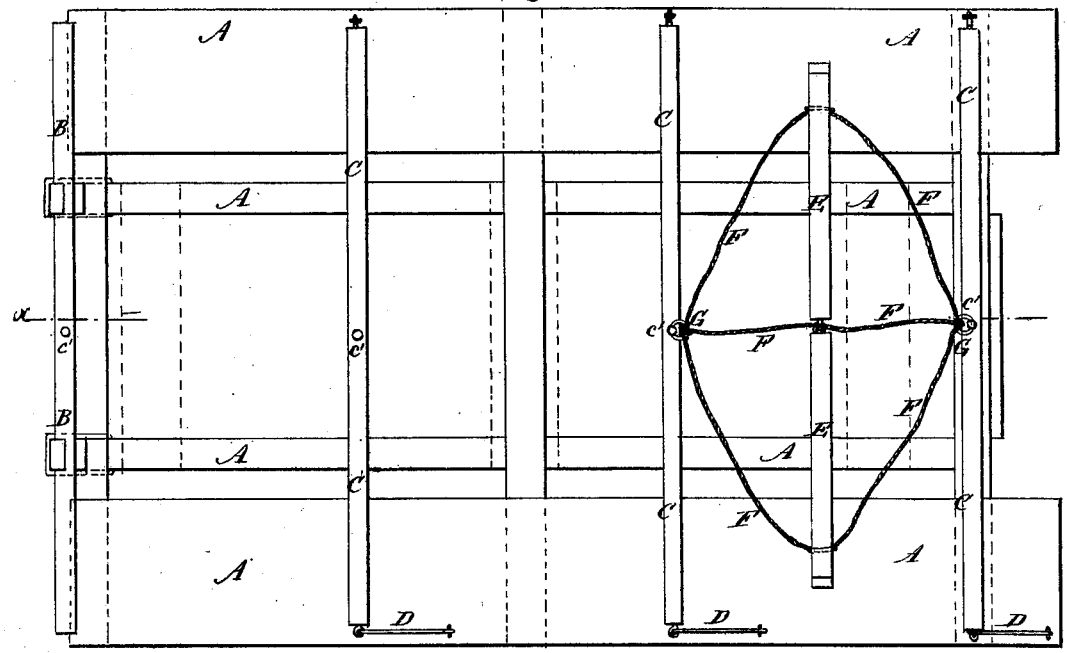
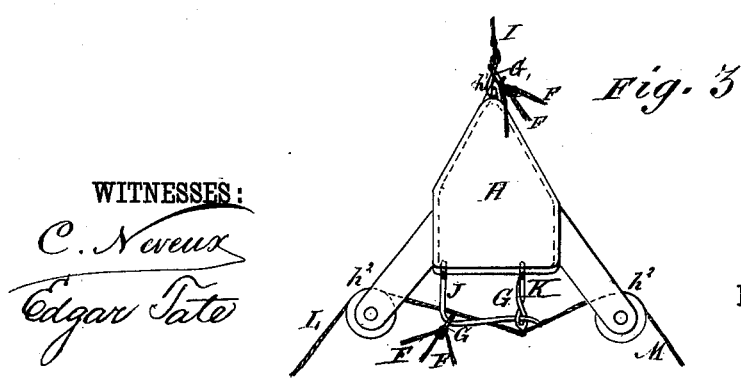

UNITED STATES PATENT OFFICE.

ROBERT COWDEN, OF NEW RICHMOND, PENNSYLVANIA.

IMPROVEMENT IN HAY AND GRAIN UNLOADERS.

Specification forming part of Letters Patent No. 198,574, dated December 25, 1877; application filed December 4, 1877.

*To all whom it may concern:*

Be it known that I, ROBERT COWDEN, of New Richmond, in the county of Crawford and State of Pennsylvania, have invented a new and useful Improvement in Apparatus for Unloading Hay and Grain, of which the following is a specification:

Figure 1 is a vertical longitudinal section of my improved apparatus, taken through the line $x$ $x$, Fig. 2. Fig. 2 is a top view of the same. Fig. 3 is a side view of the hoisting-block and its attachments.

Similar letters of reference indicate corresponding parts.

The object of this invention is to furnish an improved apparatus for unloading hay and grain, which shall be so constructed as to enable the hay and grain to be unloaded quickly and conveniently and without being scattered and wasted.

The invention consists in the combination of the hinged frames and their hooks with the rack, to divide the load into sections; in the combination of the bars and ropes with the rack and the hinged frames; and in the combination of the block, provided with the loop, the pulleys, the hook and eye, and the two ropes, with the hoisting-rope and the ropes and bars, as hereinafter fully described.

A represents an ordinary hay-rack, which is placed upon a wagon in the usual way. To the front end of the rack A is attached a cross-frame, B. To the side bars of the rack A are hinged, at equal distances apart, three (more or less) cross-frames, C, which are held erect by hooks D, pivoted to the rack A, and hooking into eyes or staples attached to the posts of the said frames C. The frames C thus divide the load into equal and distinct sections, each of which may be removed without disturbing the others.

E are two bars, hinged to each other at one end, and which are made of such a length as to reach across, or nearly across, the rack A. To the outer and inner ends of the bars E are attached the inner ends of three pairs of ropes, F. The outer ends of the three ropes F upon each side meet, and are attached to rings G. The ropes F are made of such a length that the rings G may be hooked upon pins $c'$, attached to the centers of the top bars of the frames C. The sections of the load are built upon the bars and ropes E F, between the frames C, and are thus entirely distinct.

H is a block, to the top of which is attached a loop or eye, $h^1$, to receive the hook of the hoisting-rope I. To the lower side of the block H are pivoted a hook, J, and eye K. To the eye K are attached the ends of two ropes, L M, which pass over guide-pulleys $h^2$, pivoted to the opposite edges of the bottom of the block H, or to short arms attached to said block. The ropes L M extend down into such a position that they may be reached by the operator, the one, L, being designed to hold the eye K upon the hook J, and the other, M, to draw the said eye K off the said hook J, when the load has been carried to the place where it is to be dropped. The hoisting-rope I is passed over pulleys, and is drawn by a horse in the same manner as when a fork is used for unloading. When the loaded wagon has been drawn to the barn or other place of unloading, the hoisting-rope I is unhooked from the block H, passed through one of the rings G, and again hooked into its loop. The other ring G is then passed over the hook J, and the eye K is passed over the end of the said hook, and the section of the load is ready to be raised. By this arrangement, when the rope M is pulled to drop the load the ropes and bars F E will remain suspended from the block H by one of the rings G, and will be brought back to the wagon by and with the said block H.

Having thus described my invention, I claim as new and desire to secure by Letters Patent—

1. The combination of the hinged frames C and their hooks D with the rack A B, to divide the load into sections, substantially as herein shown and described.

2. The combination of the bars E and ropes F with the rack A B and the hinged frames C, substantially as herein shown and described.

3. The combination of the block H, provided with the loop $h^1$, the pulleys $h^2$, the hook and eye J K, and the ropes L M, with the hoisting-rope I and the ropes and bars F E, substantially as herein shown and described.

ROBERT COWDEN.

Witnesses:
JOHN J. HENDERSON,
JOHN SCHEUFUREOKEN.